United States Patent [19]

Gordon

[11] Patent Number: 4,545,951
[45] Date of Patent: Oct. 8, 1985

[54] METHOD AND APPARATUS FOR BELLING PIPE ENDS

[76] Inventor: John H. Gordon, 855 Brandywine Rd., Downingtown, Pa. 19335

[21] Appl. No.: 635,803

[22] Filed: Jul. 30, 1984

[51] Int. Cl.$^4$ .................. B29C 15/00; B29C 17/07
[52] U.S. Cl. ........................... 264/322; 425/387.1; 425/393; 425/DIG. 218
[58] Field of Search ............... 264/320, 322; 425/383, 425/384, 387.1, 392, 393, 398, DIG. 218, 521

[56] References Cited

U.S. PATENT DOCUMENTS

| | | | |
|---|---|---|---|
| 3,672,804 | 6/1972 | Dalik | 425/DIG. 218 |
| 4,157,372 | 6/1979 | Kyomen | 264/322 |
| 4,277,231 | 7/1981 | Gordon | 425/393 |
| 4,353,860 | 10/1982 | Gordon | 264/322 |

*Primary Examiner*—Willard E. Hoag
*Attorney, Agent, or Firm*—Steele, Gould & Fried

[57] ABSTRACT

A pipe belling method and apparatus are disclosed which includes an elongated frame to support all of the operating components. A pressure chamber is reciprocal upon frame supported rails between an initial position and a belling position for continuous plastic pipe belling operations. Within the pressure chamber is supported a shaped mandrel to impress a desired hub or bell shape in one previously heated end of a length of pipe. Transverse pipe clamps are carried upon the frame forwardly of the pressure chamber to secure one end of the length of pipe in concentric alignment with the mandrel. When the pressure chamber and the mandrel are urged along the rails to the belling position, the mandrel will be inserted into the heated end of the pipe and a resilient, planar gasket will seal the forward end of the pressure chamber against the pipe clamps and against the pipe itself. When the forward seal has been made up, fluid pressurizing forces are introduced into the pressure chamber to uniformly press the pipe end peripherally about the mandrel to precisely form the desired bell shape. After a sufficient period of time has elapsed to properly form the bell shape, the seal is broken, the pressure chamber and mandrel are reciprocated to their initial positions, the pipe clamps are opened and the pipe with the bell shape is withdrawn from the apparatus.

20 Claims, 5 Drawing Figures

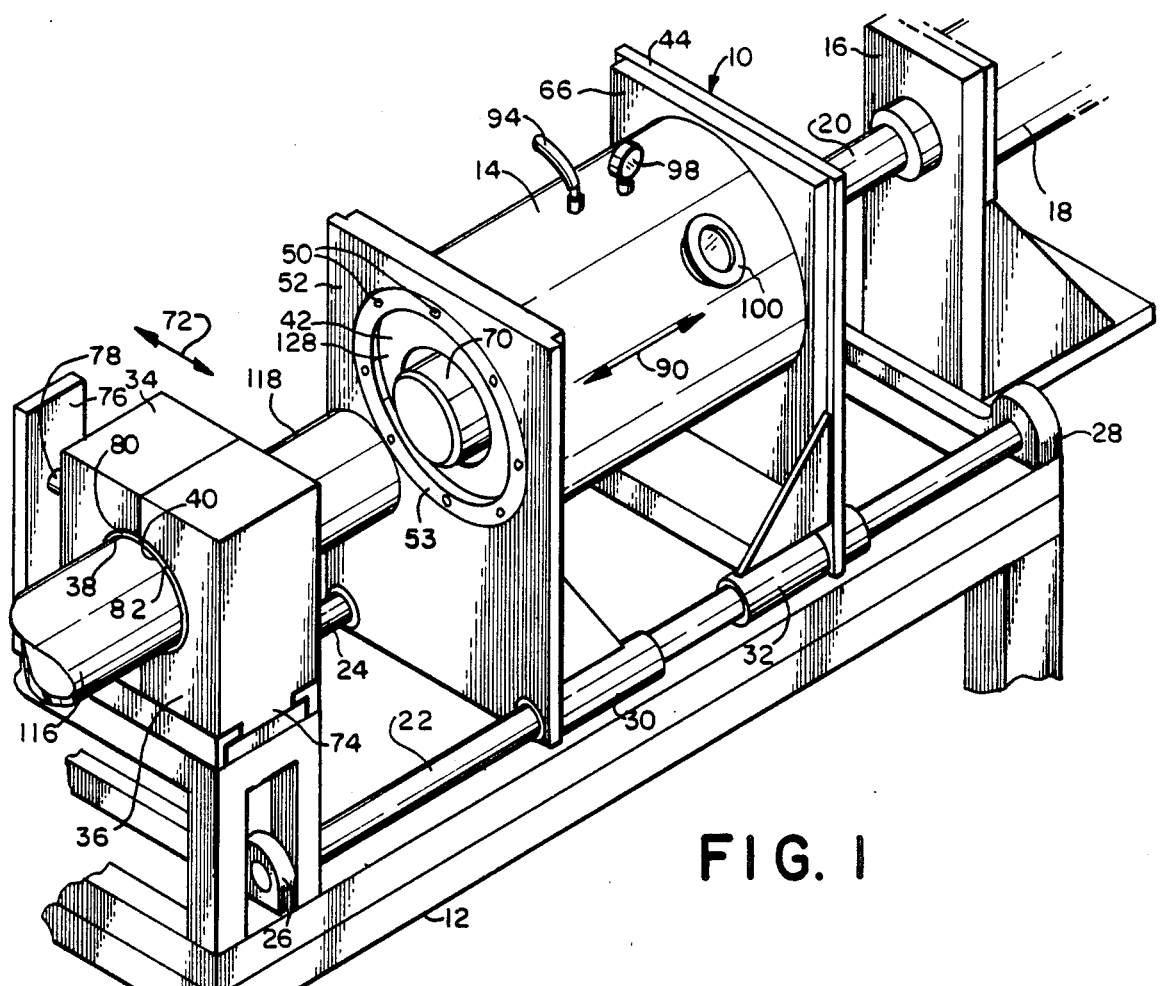
FIG. 1
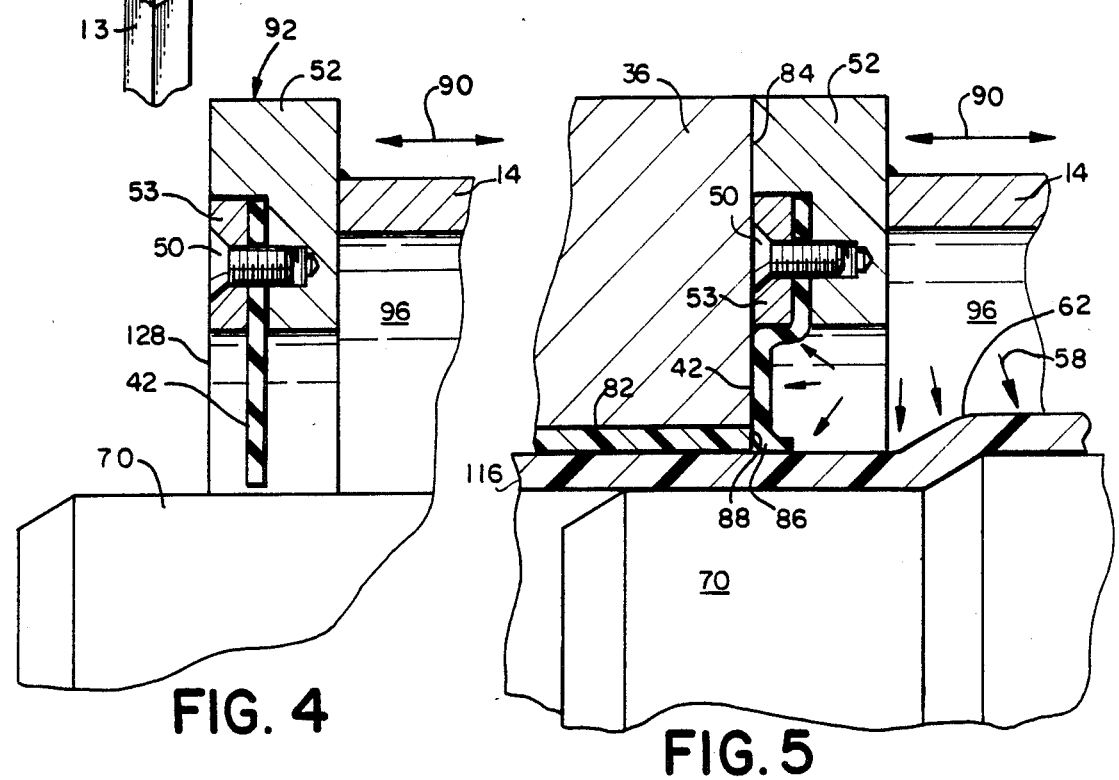
FIG. 4
FIG. 5

4,545,951

METHOD AND APPARATUS FOR BELLING PIPE ENDS

FIELD OF THE INVENTION

The present invention relates genarally to the field of forming bells or sockets in one end of a length of plastic pipe, whereby the joints between adjacent lengths of plastic pipe can be conveniently made by inserting the unbelled or spigot end of one length of pipe into the bell or socket formed in the end of the next adjacent length of pipe.

BACKGROUND OF THE INVENTION

The apparatus of the present application relates to a pipe belling machine of the type designed to receive and treat one end of a length of plastic pipe wherein the said end had been heated sufficiently to soften the plastic for bell forming purposes.

In prior art pipe belling apparatus, it was known to utilize a shaped mandrel of predetermined configuration within a pressure chamber in axial alignment with each length of pipe as the pipe was secured within the chamber. Suitable operating mechanism was provided to facilitate insertion of the mandrel within the heated pipe end for end shaping into the desired bell or hub-shaped configuration. After the pipe end and the mandrel had been properly associated, the openings to the pressure chamber were sealed in an automatic manner and pressure was introduced within the chamber and about the pipe whereby the previously softened pipe walls were uniformly pressed against the outer periphery of the mandrel by the pressure built up within the pressure chamber. In this manner, the pressure within the chamber was utilized to accurately and precisely impress the shape of the mandrel upon the interior periphery of the pipe end.

After the application of the pressure chamber forces for an adequate period of time to form the desired shape, the end of the pipe was cooled in a known manner to set the desired shape in the plastic. The pressure chamber seal was then released to relieve the pressure and to provide a pressure chamber opening of sufficient size to thereby permit withdrawal of the shaped pipe from the pressure chamber.

The present applicant has previously invented apparatus and method for employing a pressure chamber for pressure forming a bell shape in plastic pipes as above described and as set forth in U.S. Pat. No. 4,277,231, dated July 7, 1981 and U.S. Pat. No. 4,353,860, dated Oct. 12, 1982. A copy of each of the applicant's patents is annexed hereto and made part hereof.

SUMMARY OF THE INVENTION

The present invention relates generally to the field of impressing bell shapes in previously heated ends of lengths of plastic pipes. More particularly, the present invention is directed to a novel pressure chamber including a pipe belling mandrel therewithin in combination with means to stationarily position and clamp the pipe end to be belled and means to move the pressure chamber and the mandrel into pressure forming position about the clamped end of the pipe.

The present pressure chamber construction comprises generally a frame or bed upon which are mounted at least a pair of laterally spaced, longitudinally aligned rails and a pressure chamber carriage that is movable longitudinally along the rails between an initial position and a belling position. A mandrel is operatively secured with the pressure chamber and is reciprocal relative to a clamped pipe end in conjunction with the pressure chamber between an initial position and a belling position.

A pair of similar, opposite pipe clamps or jaws are mounted on a forward part of the bed or frame and at least one jaw is arranged for transverse reciprocation between an initial, open position corresponding to the initial positions of the pressure chamber and mandrel and a closed, clamping position corresponding to the belling positions of the pressure chamber and mandrel.

In accordance with the teachings of this invention, lengths of plastic pipe having one end preheated in known manner are advanced serially toward the pressure chamber by utilizing a feeding or indexing machine of known design. Each length of plastic pipe in turn is introduced automatically between the pipe clamps or jaws in longitudinal alignment with the belling mandrel. After the pipe is received within the jaws, the machine is operated to reciprocate the jaws or clamps to their closed or clamping position wherein the pipe sidewalls are tightly clamped within the jaws in a manner to prevent longitudinal alignment movement of the pipe. Substantially simultaneously, the pressure chamber and the associated mandrel are advanced toward the heated and clamped end of the pipe along the rails to the belling position and the mandrel is urged within the heated end of the pipe to a belling position.

With the parts so positioned, gasous or liquid pressure is introduced within the pressure chamber and a forward pressure chamber seal is pressed by the hydraulic pressure forces against the rear faces of the pipe clamps to tightly seal the forward end of the pressure chamber against the clamps. When the seal has been formed, pressure can be increased within the pressure chamber to a predetermined value and maintained for a predetermined length of time as may be necessary to accurately impress a desired bell-shape configuration in the pipe end.

After the desired bell-shaped oonfiguration has been applied to the end of the plastic pipe, the end can then be oooled by water or otherwise to set the mandrel shape in the plastic in a manner well-known to those skilled in the art. Pressure within the chamber can then be relieved, also in known manner, and the pressure chamber together with its associated mandrel can then be reciprocated rearwardly along the frame to the said initial position. At the same time, the machine functions automatically to separate the jaws or clamps sufficiently to permit withdrawal of the bell-shaped end of the plastic pipe and to urge the jaws to their initial position for receipt of the next serially advanced length of plastic pipe.

The internal diameter of the pressure chamber is designed to be larger than the external diameter of the shaped bell which is to be formed within the pressure chamber whereby the pressure chamber walls will never contact the outer periphery of the pipe, either when unbelled or when belled. The pressure of the fluid introduced into the pressure chamber is utilized to press the heated, soft pipe walls against the mandrel for the bell shaping process without requiring the use of other tools, such as exterior clamps, which have sometimes been employed in the bell forming prccess. Thus, the bell-shape can be smoothly made without marring or otherwise deforming the outer periphery of the finished product.

The use of the pressure chamber offers the advantages of precision accuracy in shape and in the manufacturing capability to precisely form substantially any bell-shaped profile which may be specified or desired by the end user, either with or without an internal gasket groove.

It is therefore an object of the present invention to provide an improved pipe belling apparatus including a pressure chamber of the type set forth.

It is another object of the present invention to provide a novel pipe belling apparatus comprising in combination, a longitudinally elongated bed, a pair of transversely spaced rails supported upon the bed, a pressure chamber arranged for longitudinal reciprocation along the rails together with a pressure chamber positioned mandrel, a pair of transversely positioned jaws to clamp the pipe during the belling cperation and means to seal the pressure chamber against the jaws to facilitate pressure buildup within the pressure chamber during the pipe belling operation.

It is another object of the present invention to provide a novel pipe belling apparatus comprising a longitudinally reciprocating pressure chamber, a longitudinally reciprocating mandrel, a pair of transversely reciprocating jaws to stationarily retain a length of plastic pipe for belling purposes and means to seal the pressure chamber against the jaws to prevent the escape of the fluid pressure during the pipe belling operation.

It is another object of the present invention to provide a novel pipe belling apparatus for pressure forming bell-shaped sockets in plastic pipes that is rugged construction, simple in design and trouble-free when in use.

Other objects and a fuller understanding of the invention will be had by referring to the following description and claims of a preferred embodiment thereof, taken in conjunction with the accompanying drawings, wherein like reference characters refer to similar parts throughout the several views and in which:

BRIEF DESCRIPTION OF THE DRAWINGS

FIG. 1 is a perspective view of the pipe belling apparatus including the reciprocating pressure chamber of the present invention.

FIG. 4 is a partial, enlarged, detailed view of the front pressure chamber seal in its initial position.

FIG. 5 is an enlarged, partial, detailed view of the front seal of FIG. 4 in the pipe belling position.

DESCRIPTION OF THE PREFERRED EMBODIMENT OF THE INVENTION

Figure 2:
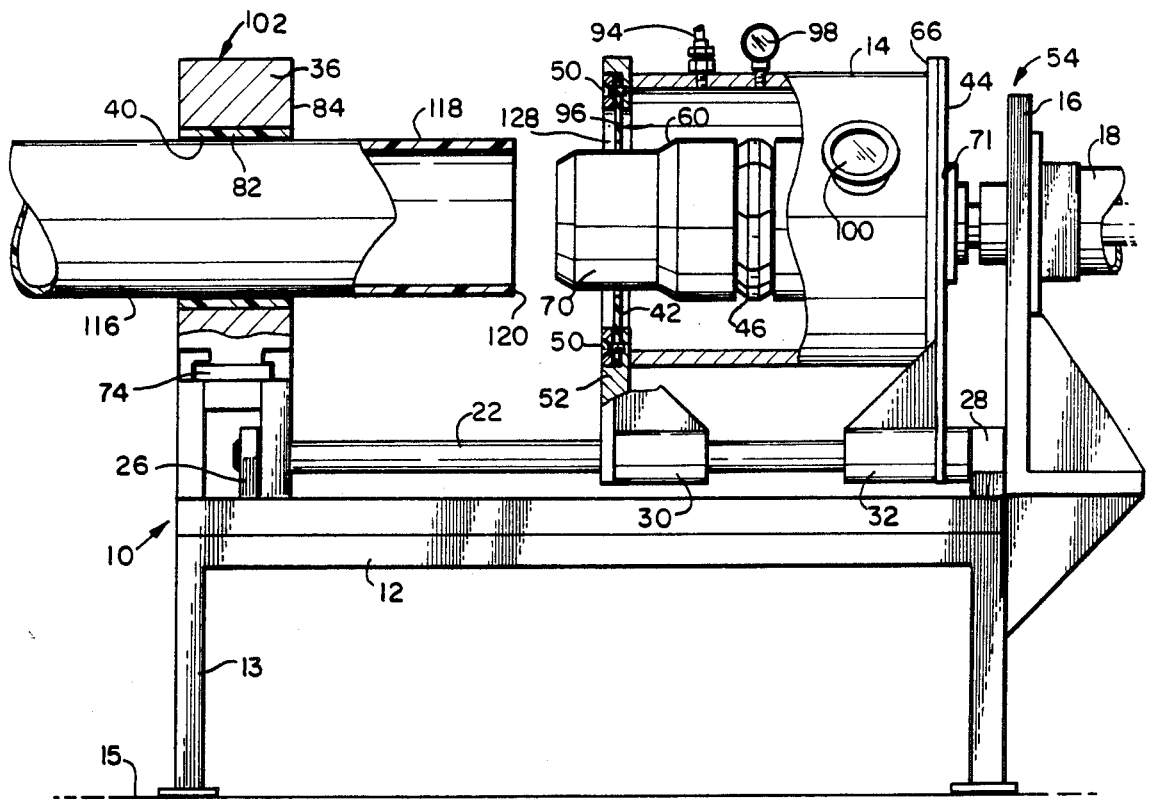
FIG. 2 is a side elevational view of the belling apparatus of FIG. 1, partially broken away to expose interior construction details, and showing the pressure chamber and the mandrel in their initial positions.

Although specific terms are used in the following description for the sake of clarity, these terms are intended to refer only to the particular structure of the invention selected for illustration in the drawings, and are not intended to define or limit the scope of the invention.

Figure 3:
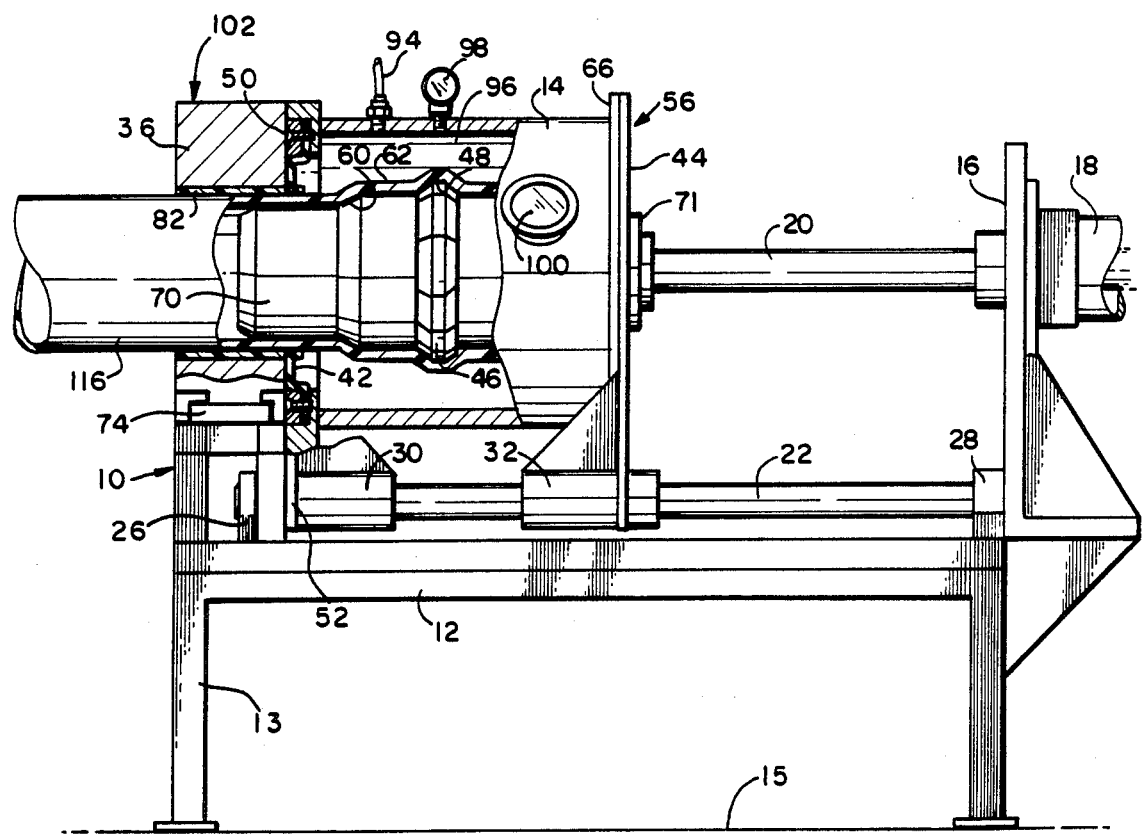
FIG. 3 is a side elevational view similar to FIG. 2, partially broken away to expose interior construction details, and showing the parts in their pipe belling positions.

As illustrated in FIGS. 1-3, te pipe belling machine 10 comprises a stationary, longitudinally elongated, sturdy, structural steel frame or bed 12 of strength sufficient to secure the operating parts as they reciprocate between initial positions and belling positions in the manner hereinafter fully set forth. In the preferred embodiment, the frame includes a plurality of legs 13 to support the apparatus above a floor or other generally horizontally construction 15 in well known manner.

As shown, a pair of laterally spaced, longitudinally aligned left and right rails 22, 24 are securely supported by the frame 12 in horizontal orientation to facilitate longitudinal reciprocation of the pressure chamber 14 as the pressure chamber is reciprocated between its initial, rearward position 54 as illustrated in FIG. 2 to its forward, belling position 56 as illustrated in FIG. 3. The left and right rails 22, 24 are secured upon the frame 12 in fixed relatipnship between respective forward supports 26 and rearward supports 28 in a sturdy, known manner to permit longitudinal reciprocation of the pressure chamber 14.

The pressure chamber 14 is defined between a rear bearing plate 44 and a front bearing plate 52, which front and rear plates extend downwardly from the pressure chamber 14 to the left and right rails 22, 24 in suitable manner to form an extremely sturdy, yet movable construction. The front wall 52 terminates downwardly in a pair of laterally spaced front rail guides 30. The rear bearing plate 44 is downwardly equipped with similar but opposite, laterally spaced rear rail guides 32. The guides 30, 32 are formed with longitudinally aligned bores within which are positioned sleeves or bearings of known construction to permit substantially frictionless, longitudinal reciprocation of the pressure chamber 14 along the left and right rails 22, 24. As illustrated, the pressure chamber 14 terminates rearwardly in a pressure-tight rear chamber wall 66 and forwardly in an apertured front chamber wall and bearing plate 52. It is a feature of this invention that the entire pressure chamber assembly, including the front and rear bearing plates 52, 44 and the rear chamber walls 66 will reciprocate as a unitary structure upon the left and right rails 22, 24 for pipe belling purposes in the manner hereinafter more fully set forth.

A rear operating support 16 of sturdy construction secures upon a rearward portion of the frame or bed 12 in a known, non-movable manner, for example by welding. A main operating cylinder 18 is mounted upon the rear support 16 in secure manner to reciprocate its associated arm 20 in longitudinal alignment in a usual manner for pipe belling purposes in the manner hereinafter set forth.

If desired, the pressure chamber 14 may be provided with an inspection port 100 and a pressure gauge 98 to facilitate visual inspection during the operation thereof. An inlet connection 94 is provided in the pressure chamber wall in conventional manner to permit the introduction of fluid under pressure into the presure chamber interior cavity 96 for pipe belling purposes. Suitable valves (not shown) can be employed in conjunction with the inlet 94 to control the fluid flow into the pressure chamber cavity 96 in known manner.

As best seen in FIGS. 2 and 3, a mandrel 70 of a desired, pre-selected shape or profile is positioned within the interior 96 of the pressure chamber 14 in stationary relationship thereto for pipe belling purposes as hereinafter more fully set forth. In accordance with a design feature of this invention, both the pressure chamber 14 and the mandrel 70 are reciprocated in unison along the rails 22, 24 upon reciprocal operation of the main operating cylinder 18. The cylinder arm or operating rod 20 is secured to the rear bearing plate 44 of the pressure chamber in suitable, known manner, for example by employing a sturdy mounting flange 71. As the cylinder 18 is energized by the machine controls (not shown) to reciprocate the cylinder arm 20, the pressure chamber 14 will be caused to reciprocate longitudinally along the left and right rails 22, 24 with the mandrel 70 secured therewithin for simultaneous reciprocation.

The pressure chamber 14 terminates forwardly at the front chamber wall and bearing plate 52. A concentric pipe receiving aperture or opening 128 is formed through the front bearing plate 52 and is formed of sufficient diameter to receive therethrough the nose portion of the mandrel 70 and the heated end portion 118 of the pipe 116 upon which the bell shape is to be impressed. A planar, annular, heavy rubber gasket 42 is peripherally retained within the front opening 128 by a retaining ring 53 and a plurality of circularly spaced bolts 50, which bolts are employed in known manner to clamp the gasket 42 in place. The thickness and connection of the gasket 42 is designed for flexible, rugged operation so as to prevent gasket failure, even after many repeated cycles of belling operation.

At the front of the frame or bed 12, forwardly of the front bearing plate 52, a pair of transversely oriented blocks or pipe clamps 34, 36 are provided. In the illustrated embodiment, the pipe clamps 34, 36 are either or both horizontally slidable in the direction indicated by the double headed arrow 72 (FIG. 1) within a frame connected keyway 74. Either or both of the pipe clamps 34, 36 may be transversely reciprocated by one or more conventionally designed operating cylinders. The clamp cylinder is sturdily mounted upon the plate 76 to reciprocate its associated arm 78 in known manner to cause transverse, horizontal reciprocation of one or both pipe clamps 34, 36.

As best seen in FIGS. 1, 2 and 3, the pipe clamps 34, 36 are each provided with a semi-circular, opposite, pipe receiving opening 38, 40, which openings join in the clamping position to provide a circular clamp to serially clamp each successive length of pipe 116 as the pipe is introduced into the belling apparatus. It is a design feature of this invention that the pipe clamps 34, 36 and the bell shaping mandrel 70 may be interchanged for similar apparatus parts relatively easily whenever necessary or desired, for example, when setting up the machine 10 to handle pipes 116 of a different diameter.

If desired, as illustrated in FIGS. 2 and 3, the shaping ndrel 70 may be integrally equipped with a plurality of radially expanding segments 46 in known manner to impress an internal peripheral groove 48 (FIG. 3) in the pipe end 118 during the bell shaping procedure. The pressure chamber concept is particularly useful and efficient for this purpose.

Referring now to FIGS. 2 and 3, the operation of the pipe belling machine 10 will now be described. In order to operate the pipe belling machine of the present invention, the main cylinder 18 is energized by the machine control system (not illustrated) to pull its arm 20 rearwardly to thus urge the affixed pressure chamber 14 and the mandrel 70 to the initial position 54 shown in FIG. 2. At or about the same time, the clamp operating cylinder affixed to the plate is also energized to cause its arm or rod 78 to pull the front pipe clamp 34 transversely away from the pipe clamp 36 so that the pipe clamps 34, 36 are also urged to an initial position. As illustrated, the nose of the mandrel 70 will be positioned somewhat forwardly of the front bearing plate 52 and will be concentrically aligned within the front opening 128. The sealing gasket 42 surrounds the mandrel 70, and in the initial position, will be unstressed and arranged in a planar alignment as best seen in FIGS. 2 and 4.

With the parts thus arranged in the initial position 54, a length of plastic pipe 116 having a preheated end 118 can be introduced in known manner through the area defined between the respective semi-circularly shaped openings 38, 40 which are formed in the left and right pipe clamps 34, 36. The heated end 118 can be pushed into the belling machine 10 in known manner with apparatus (not shown) well known to those skilled in the art until the front end 120 of the pipe 116 approaches, but does not touch the nose of the mandrel 70. A control (not shown) such, as a limit switch or photosensor can be employed to sense the proper initial positioning of the pipe 116 to thereby activate automatically and in known manner the main operating cylinder 18 and the pipe clamp cylinder.

Upon activation, the cylinder 18 will actuate its arm 20 to push the pressure chamber 14 and mandrel 70 forwardly along the left and right rails 22, 24 as indicated by the left portion of the arrow 90 until the parts reach the belling position 56 as illustrated in FIGS. 3 and 5. At approximately the same time, the pipe clamp cylinder will be activated to push the pipe clamp 34 in the direction of the right portion of the arrow 72 to urge the pipe clamps 34, 36 transversly together (see FIG. 1) to securely clamp the pipe 116 therebetween and to prevent any longitudinal movement of the pipe 116 relative to the frame as the mandrel 70 is urged interiorly of the heated pipe end 118. As best seen in FIG. 3, the predetermined profile or shape 60 of the mandrel 70 will be interiorly impressed upon the heated pipe end 118 as the mandrel is urged interiorly of the pipe. The plastic pipe, because of its preheated condition, is soft enough or pliable enough to be deformed as necessary to assume the shape of the mandrel profile 60.

After the parts have been urged to the said belling position 56 as illustrated in FIGS. 3 and 5, upon the closing of the pipe clamps 34, 36 to their belling position 102, to grip the pipe 116, pressure can then be built up within the interior pressure chamber cavity 96 by introducing a fluid under pressure through the fluid inlet connection 94 until adequate pressure for belling purposes is built up within the cavity 96. In accordance with known physical properties of fluids under pressure, the introduced fluid will function to uniformly apply pressure about the entire outer periphery of the preheated pipe end 118 that is secured within the pressure chamber interior 96 as indicated by the plurality of arrows 58 (FIG. 5) to thereby uniformly press the preheated pipe end against the mandrel profile 60 to form the desired, pre-selected shape. If the design criteria requires the formation of an internal groove 48 in the final pipe bell-shape configuration 62, then the plurality of expanding segments 46 can be uniformly circularly expanded in known manner to impress the desired shape as illustrated.

Still referring to FIGS. 3 and 5, the semi circular openings 38, 40 of the pipe clamps 34, 36 are preferably lined with semi-circularly shaped sealing gaskets 80, 82 throughout the entire interior periphery of the openings 38, 40. Upon the introduction of the fluid under pressure into the pressure chamber 14 through the inlet 94, the heavy rubber gasket 42 will be impinged by the pressure forces sufficiently to force portions of the rubber gasket to flex forwardly and out of the normal planar alignment. Under influence of the built up pressure forces, the radially inwardly positioned portions of the heavy gasket 42 will be forced forwardly to press against the rearward faces 84 the pipe clamps 34, 36. It is noteworthy, as best seen in FIG. 5, that an interior peripheral portion 86 of the rubber gasket 42 will additionally be forced against and will additionally seal upon the rearward face 88 the pipe clamp gaskets 80, 82 and against the outer periphery of the pipe end 118. In the manner illustrated by the pressure indicating arrows 58, the build-up of pressure within the pressure chamber cavity 96 functions to tightly seal the pressure chamber at the pipe clamps 34, 36, thereby applying the pressure forces uniformly against the outer periphery of the heated pipe end for a predetermined length of time, as may be necessary to properly form the desired bell shape in the pipe 116.

After the bell shape has teen properly impressed in the pipe end 118, a cooling liquid (not shown) can be introduced in known manner to cool the pipe end rapidly in order to set the desired shape in the plastic. After the desired bell-shaped configuration 62 has teen impressed in the plastic pipe 116, the machine control system (not shown) will automatically actuate the cylinder 18 to pull the arm 20 longitudinally rearwardly in the rearward direction indicated by the right portion of the arrow 90. At or about the same time, the machine control system will activate the clamp cylinder to cause the cylinder arm 78 to pull the pipe clamp 34 transversely away from the pipe clamp 36 in the manner indicated by the left portion of the arrow 72. When the pressure chamber 14 and mandrel 70 reach their initial position 54 and the pipe clamps 34, 36 reach their initial position, the entire pipe belling cycle can then be automatically repeated.

Although the invention has been described with a certain degree of particularity, it is understood that the present disclosure has been made only by way of example and that numerous changes in the details of construction and the combination and arrangement of parts may be resorted to without departing from the scope of the invention.

What is claimed is:

1. A pipe belling apparatus comprising
   a frame, the frame supporting a longitudinally aligned rail;
   a pressure chamber reciprocal longitudinally along the rail between an initial position and a belling position, the pressure chamber defining an interior cavity and having a front aperture in communication with the cavity;
   a shaped mandrel positioned with the interior cavity and being adapted to reciprocate between an initial position and a belling position in response to reciprocal movements of the pressure chamber;
   pipe clamp means supported on the frame forwardly of the mandrel to secure one end of a length of pipe within the apparatus, the pipe clamp means being reciprocal between an initial position and a clamping position;
   means to reciprocate the pressure chamber and mandrel to cause the pipe end to enter thepressure chamber cavity through the opening and the mandrel to enter the end of the pipe when the pressure chamber is reciprocatd to the said belling position;
   pressure inlet means in the pressure chamber to pressurize the pressure chamber cavity; and
   seal means secured about the pressure chamber aperture to seal the pressure chamber about the pipe upon the application of pressurization force within the pressure chamber cavity.

2. The pipe belling apparatus of claim 1 wherein the seal means comprises a planar sheet of heavy, resilient material, the material being provided with a circular opening, the opening being positioned concentricly with the mandrel.

3. The pipe belling apparatus of claim 2 wherein the pipe clamp means define a circular opening to clamp the pipe when in the clamping position.

4. The pipe belling apparatus of claim 3 and a second sealing gasket lining the said circular opening in the pipe clamp means.

5. The pipe belling apparatus of claim 4 wherein a first portion of the planar sheet of the seal means contacts and seals against the second sealing gasket when the pressure chamber is reciprocated to its belling position.

6. The pipe belling apparatus of claim 5 wherein a second portion of the planar sheet of the seal means contacts and seals against the pipe clamp means when the pressure chamber is reciprocated to its said belling position.

7. The pipe belling apparatus of claim 6 wherein a third portion of the planar sheet of the seal means contacts and seals against the outer periphery of the end of the length of pipe when the pressure chamber is reciprocated to its said belling position.

8. The pipe belling apparatus of claim 7 wherein there is no longitudinal movement of the mandrel relative to the pressure chamber as the parts are reciprocated between their initial and belling positions.

9. The method of forming a bell shape in a heated end of a length of plastic pipe comprising
   clamping the end of a heated pipe between clamps;
   moving a pressure chamber from an initial position to a belling position about a portion of the said heated pipe end;
   simultaneously moving a bell-shaped mandrel while within the pressure chamber from an initial position to a belling position and inserting the shaped mandrel into the heated pipe end;
   creating a seal between the presure chamber and the pipe end;
   pressurizing the pressure chamber and pressing the heated end of the pipe uniformly against the mandrel for a sufficient period of time to form the bell-shape of the mandrel in the pipe end; and
   withdrawing simultaneously the pressure chamber and mandrel away from the pipe end and unclamping the pipe.

10. The method of claim 9 wherein the creating a seal comprises deforming a planar resilient gasket by utilizing the pressurizing forces.

11. The method of claim 10 wherein the creating a seal comprises pressing a circular portion of the resilient gasket against the clamps.

12. The method of claim 10 wherein the creating a seal comprises pressing a radially inward portion of the resilient gasket against the end of the pipe.

13. The method of claim 11 wherein the creating a seal comprises pressing a radially inward portion of the resilient gasket against the end of the pipe.

14. The method of claim 9 wherein the clamping comprises interposing a circular gasket between the clamps and the end of the pipe and pressing the circular gasket directly against the pipe.

15. The method of claim 14 wherein the creating a seal comprises deforming a planar resilient gasket by utilizing the pressurizing forces and pressing a radially inward portion of the resilient gasket directly against a rearward portion of the said circular gasket.

16. The method of claim 9 and the further step of radially exanding portions of the mandrel while pressurizing to form an interior peripheral groove in the pipe end.

17. A pipe belling apparatus comprising
   a longitudinally elongated bed, the bed supporting a pair of transversely spaced, longitudinally aligned rails;
   a pressure chamber means arranged for longitudinal reciprocation along the rails between an initial positin and a pipe belling position, the pressure chamber means receiving pressurizing forces;
   a mandrel means mounted upon the pressure chamber means, the mandrel means being reciprocated between an initial position and a belling position when the pressure chamber means is reciprocated;
   clamp means transversely movable upon the bed forwardly of the pressure chamber means, the clamp means securing a pipe in longitudinal alignment with the mandrel means as the mandrel means is reciprocated toward its said belling position; and
   seal means carried by the pressure chamber means to seal between the pressure chamber means and the clamp means to prevent leakage of the pressurizing forces between the pressure chamber means and the clamp means.

18. The pipe belling machine of claim 17 wherein the seal means comprises a planar resilient sheet, the said sheet being provided with a central opening and wherein a forward portion of the mandrel means projects through the opening.

19. The pipe belling machine of claim 18 wherein the sheet is deformed by the pressurizing forces when the pressure chamber means is reciprocated to the pipe belling position, a first deformed portion of the sheet being in sealing contact with the clamp means.

20. The pipe belling machine of claim 19 wherein a second deformed portion of the sheet is in sealing contact with a peripheral portion of the pipe when the pressure chamber is moved to its said belling position.

* * * * *